United States Patent
Hobbs et al.

[19]

[11] Patent Number: 5,830,295
[45] Date of Patent: Nov. 3, 1998

[54] PNEUMATIC TIRE WITH BELT STRUCTURE INCLUDING REINFORCED GUM STRIPS

[75] Inventors: Russell Earl Hobbs, Ridgeley; Terry Russell Phillips, Keyser; Michael Anthony Witten, Fort Ashby, all of W. Va.

[73] Assignee: The Goodyear Tire & Rubber Company, Akron, Ohio

[21] Appl. No.: 800,948

[22] Filed: Feb. 14, 1997

[51] Int. Cl.⁶ .................. B60C 9/18; B60C 9/20; B60C 9/26
[52] U.S. Cl. .................. 152/527; 152/526; 152/528; 152/529; 152/537
[58] Field of Search .................. 152/528, 529, 152/532, 537, 527, 526

[56] References Cited

U.S. PATENT DOCUMENTS

| | | |
|---|---|---|
| 3,357,470 | 12/1967 | Massoubre .................. 152/528 |
| 3,404,721 | 10/1968 | Massoubre .................. 152/529 X |
| 3,598,165 | 8/1971 | Hanus . |
| 3,799,233 | 3/1974 | Cappa . |
| 3,945,421 | 3/1976 | Poque et al. . |
| 4,062,393 | 12/1977 | Bertrand . |
| 4,142,568 | 3/1979 | Kleijwegt . |
| 4,273,177 | 6/1981 | Nybakken . |
| 4,957,151 | 9/1990 | Takehara .................. 152/529 X |
| 5,014,762 | 5/1991 | Beer et al. . |
| 5,131,446 | 7/1992 | Fukumoto et al. . |
| 5,335,707 | 8/1994 | Sano et al. . |
| 5,435,369 | 7/1995 | Yap et al. . |
| 5,447,776 | 9/1995 | Disselbeck . |
| 5,605,589 | 2/1997 | Johanning et al. .................. 152/532 |

FOREIGN PATENT DOCUMENTS

| | | | |
|---|---|---|---|
| 1080099 | 6/1980 | Canada .................. | 152/528 |
| 0 687 581 A2 | 12/1995 | European Pat. Off. .......... | 152/527 |
| 1226595 | 7/1960 | France .................. | 152/528 |
| 1253395 | 1/1961 | France .................. | 152/528 |
| 1258886 | 3/1961 | France .................. | 152/528 |
| 1299622 | 6/1962 | France .................. | 152/528 |
| 1416538 | 9/1965 | France .................. | 152/528 |
| 53-119502 | 10/1978 | Japan . | |
| 60-94803 | 5/1985 | Japan .................. | 152/529 |
| 60-163705 | 8/1985 | Japan .................. | 152/529 |
| 62-244702 | 10/1987 | Japan . | |
| 3266703 | 11/1991 | Japan . | |
| 6127210 | 5/1994 | Japan . | |
| 1324867 | 7/1987 | U.S.S.R. . | |
| 1608090 | 11/1990 | U.S.S.R. . | |
| 1067856 | 5/1967 | United Kingdom . | |
| 1590013 | 5/1981 | United Kingdom .......... | 152/528 |

*Primary Examiner*—Adrienne C. Johnstone
*Attorney, Agent, or Firm*—David E. Wheeler

[57] ABSTRACT

A radial ply tire (10) has a belt assembly (21) of at least one, and preferably two, belt plies (22, 23). At least one of the belt plies has a gum strip laying flat against a belt edge or folded over the edge of a belt ply such that there is at least one reinforced gum strip on each lateral side of the belt assembly. The reinforced gum strip comprises parallel reinforced cords encapsulated in gum treatment of 0.015 to 0.55 total gauge, wherein the reinforcing cords make an angle of 5° to 90° with respect to the equatorial plane (EP) of the tire.

7 Claims, 3 Drawing Sheets

PNEUMATIC TIRE WITH BELT STRUCTURE INCLUDING REINFORCED GUM STRIPS

BACKGROUND OF THE INVENTION

The present invention relates to radial pneumatic tires adapted for high speed use for highway and race track driving.

High-speed durability has been improved in the prior art by providing an overlay ply which is interposed between the radially outermost belt ply and the tread and consists of a ply or spiral wrap having a width which is about equal to that of the widest of the belt plies, and by providing folded belt structures in tires.

It has also been proposed in the prior art to use overlay plies comprising several circumferentially spaced overlapping sections, thereby allowing the stresses in the cords to be taken up by the overlap portions which are spaced around the circumference of the tire (see e.g. DE-A-28 24 357 and DE-A-28 21 093).

From U.S. Pat. No. 4,284,117, it is known to use single yarn reinforcing cords for the overlay ply and to wrap more than one turn of this ply around the circumference of the tire thereby greatly reducing the possibility of any slippage of the overlay ply in the finished tire. Since the belt ply itself cannot accommodate the expansion of the belt through slippage, the expansion is entirely taken up by the reinforcing yarns which for this reason have a relatively low modulus of elongation as compared to the cords used in single layer overlay plies.

It has been disclosed in British patent specification No. 1,590,730 to place two strips of elastomeric material at the side edges of the breaker layers. In each strip, polyamide cords are arranged parallel to each other and to the side edges of the strip itself, so that on the carcass, the cords are essentially parallel to the equatorial plane of the tire. The central portion consists of a strip having a length slightly greater than the carcass development, so that its ends overlap; as an alternative, the central portion can consist of a single polyamide cord wound around the breaker layers so that its cords are arranged parallel to the equatorial plane of the tire in order to cover the entire central portion thereof.

Overlays in tires are very expensive and if required properties can be maintained in tires without such overlays a significant cost savings would be obtained. Prior art gum strips apparently do not provide suitable durability for use without overlays or folded belt structures.

There is provided in accordance with the present invention a pneumatic tire made without an overlay which is durable at high speeds and which at the same time has a high degree of uniformity.

SUMMARY OF THE INVENTION

The present invention employs a reinforced gum strip located at the belt ply edges. The reinforcement cords or filaments in the gum strip are oriented in the tire at an angle of 5° to 90° with respect to the equatorial plane (EP) of the tire. The tire of the invention is a pneumatic tire for high speed use comprising a radial ply carcass, a tread disposed radially outwardly of the crown region of the carcass, and a belt assembly including at least one belt ply interposed between the tread portion and the crown region in circumferential surrounding relation to the carcass. At least one belt ply of the belt assembly has a reinforced gum strip covering or folded around a belt edge on each opposed lateral side of the belt assembly. The reinforced gum strip is made from reinforced elastomeric material and is located in the proximity of the belt edges. Reinforcement cords in said gum strip are made of organic polymers selected from the group consisting of nylon, polyester, aromatic polyamides and mixtures thereof.

Tires of the present invention can be used, in many instances, instead of tires made using expensive overlay and folded belt constructions.

A tire according to the instant invention has low ply steer (ply steer is a force component which changes direction with reverse rotation, when measuring the tire lateral force variations), excellent handling characteristics and a uniform tread wear when operated at high speed.

BRIEF DESCRIPTION OF THE DRAWINGS

To acquaint persons skilled in the art most closely related to the instant invention, certain illustrated embodiments thereof are now described with reference to the annexed drawings.

DETAILED DESCRIPTION OF THE INVENTION

The present invention relates to a pneumatic tire comprising a radial ply carcass, a tread disposed radially outwardly of the crown region of the carcass, a belt assembly interposed between the tread portion and the crown region of the carcass in circumferential surrounding relation to the carcass. In the illustrated embodiment, the belt assembly includes two plies, each of which comprises cords of high modulus material extending parallel to one another in each belt ply and making opposed angles with respect to the equatorial plane of the tire. The belt assembly has an overall width at least equal to that of the tread and on each of its lateral sides has at least one reinforced belt edge gum strip.

Those skilled in the art will recognize that high speed tires of the invention may comprise one or two carcass plies and one to four belt plies and one pair of parallel annular beads.

Figure 1:
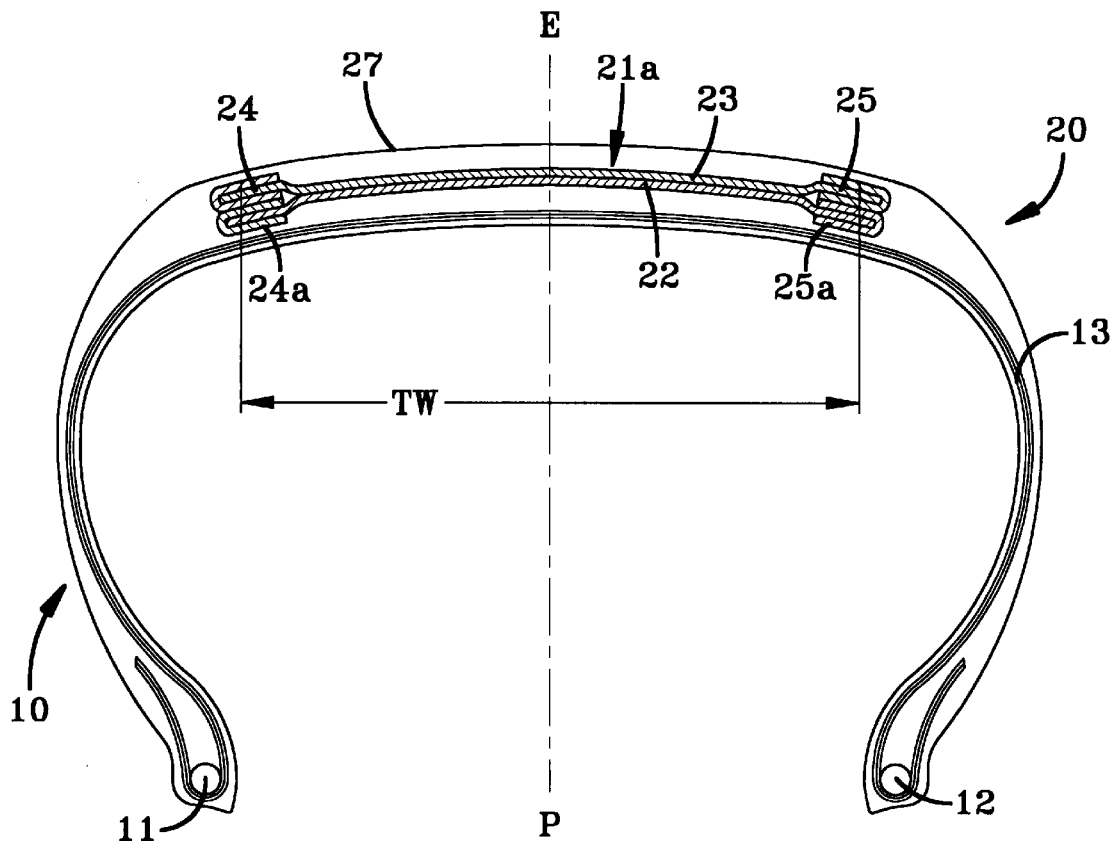
FIG. 1 is a cross-sectional view of a pneumatic tire made in accordance with the present invention.

With reference to FIG. 1, there is represented a radial carcass pneumatic tire 10 having a pair of substantially inextensible bead cores 11, 12 which are axially spaced apart with a radial carcass ply 13 extending between the bead cores. The carcass ply is folded axially and radially outwardly about each of the bead cores and is reinforced by cords which are substantially parallel to each other and make an angle of about 65° to 90° with the equatorial plane (EP) of the tire. The cords of the carcass ply 13 can be made of any suitable material, for example steel, rayon, polyester, polyamide or aromatic polyamide.

As used herein, similar numbers may be used to identify similar portions of the invention in different drawings, but may be subscripted with letters to identify modifications.

As used herein and in the claims, the "equatorial plane" of the tire is a plane that is perpendicular to the axis of rotation of the tire and passes through the center of the tire tread, the terms "axial" and "axially" refer to directions which are parallel to the axis of rotation of the tire and the terms "radial" and "radially" refer to directions that are radially toward or away from the axis of rotation of the tire.

Figure 2:
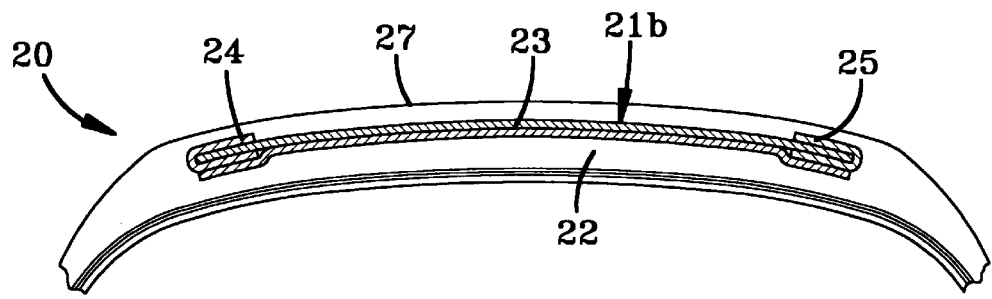
FIG. 2 is an enlarged view of the crown reinforcement of an alternative embodiment of the tire shown in FIG. 1.
Figure 3:
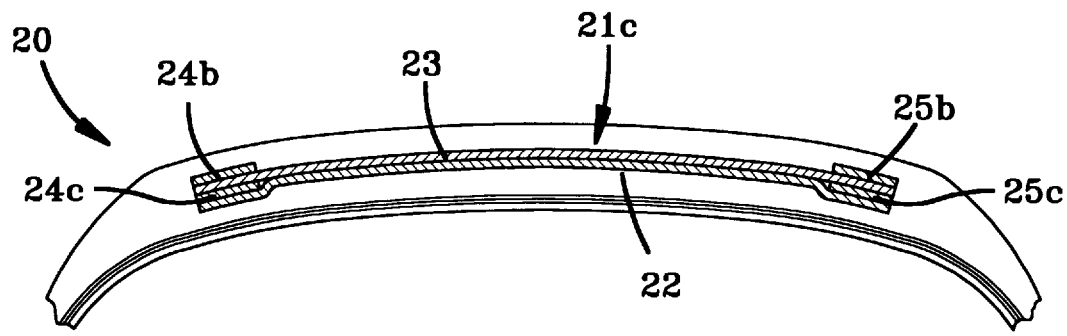
FIGS. 3, 4 and 4a are representations of alternative embodiments of reinforcing structures according to the present invention.
Figure 4:
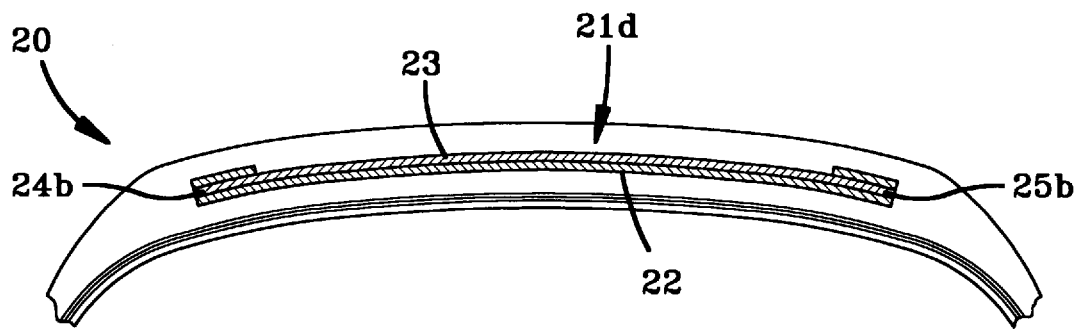
Figure 4A:
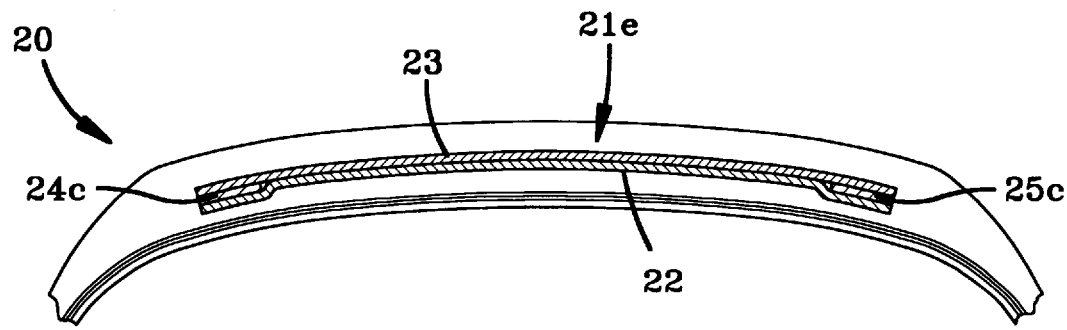

As can be more clearly distinguished in FIG. 2, the crown area 20 of the tire is reinforced in an alternative embodiment of a belt assembly 21 located radially inwardly of the tire tread 27. In the illustrated embodiments of FIGS. 1–4a, the belt assembly is essentially rigid and comprises two concentric belts 22 and 23, each of which comprises an elastomeric belt ply reinforced by aromatic polyamide cords or other suitable material, as for example, steel, glass fiber, carbon-fiber or nylon. Within each belt ply, the cords are substantially parallel to each other, but they make with the cords in the other belt ply opposed angles with respect to the equatorial plane of the tire. The cords of the radially innermost belt ply 22 make e.g. an angle of 15° to 35° with respect to the equatorial plane (EP) of the tire, whereas the cords of the radially outermost belt ply 23 extend in the diagonally opposite direction to the cords of the radially innermost belt ply, i.e. they make an angle of −15° to −35° with respect to the equatorial plane (EP) of the tire.

Unlike tires of the prior art that employ belt edge reinforcing strips (BERS), the tire of the invention does not have a folded belt structure and does not employ an overlay structure.

In the illustrated embodiment, reinforced strips 24,25 comprise a 210/2 denier parallel cords encapsulated in a gum rubber which has a total gauge of 0.015 to 0.055 inch. The reinforcement cords are made of nylon, polyester or aramid filaments or cords, or mixtures thereof Those skilled in the art will recognize that for special applications larger denier or lower denier cords can be used and, it is contemplated that reinforcement as heavy as 420/2 denier and as light as 105/1 denier can be used in the invention.

In the illustrated embodiment, 210/2 nylon reinforcing cords are used in the gum strip 24,25. The gum strip is cut so that reinforcing cords in the gum strip make an angle of 5° and 90°, preferably 30° to 75°, and more preferably 30° to 45° with respect to the linear direction of the gum strip, which will comprise the same angle with respect to the equatorial plane (EP) of the tire when the gum strip is applied to a belt edge in a tire construction.

The gum strip is cut into widths of 5 mm to 40 mm and may be applied flat on a belt edge (FIGS. 3, 4 and 4a) or folded around the belt edges (FIGS. 1, 2) when used in a tire construction.

When folded around a belt edge, the strip may be applied symmetrically or may be extended so that there is more or less overlap of the strip over the top edge of the belt as compared to the bottom edge of the belt. Strips 24, 25 may be applied to all the belts in the tire (FIG. 1) or just applied to the top belt (FIG. 2) as deemed necessary for specific durability and performance properties required.

Tires made with BERS of the invention have shown an improvement of 1½ speed steps (speed increases 10 mph for a ten minute period in increments until the tire is destroyed) while the tire is made more inexpensively because no overlays and no folded belts are used in the construction.

Apparently the described orientation of the reinforcing cords of the gum strip in a tire is critical since test tires in which a 90° angle with respect to the EP of the tire was used for such reinforcement did not show a comparable improvement.

The belt edge gum strip has a thickness of about 1 mm and a width of 10 to 40 mm, and preferably a width of 20 to 35 mm, and a cord distribution density of at least 12 EPI (ends per inch) and preferably 25 to 35 EPI.

Figure 5:
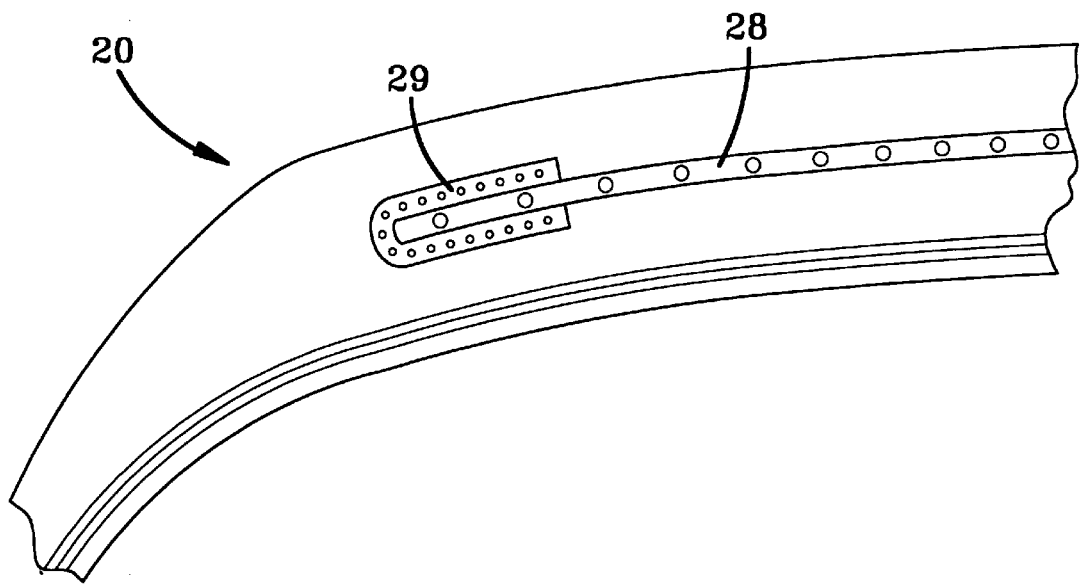
FIG. 5 illustrates an enlarged view of a belt edge wrapped with a gum strip.

Referring to FIG. 5, there is illustrated a portion of a belt structure 28 wherein reinforced gum strip 29 is wrapped around the edge thereof. In the Figures, the width of the overlap of gum strips 24 , 25, 29 on belts 22, 23, 29 is 1/20 to 1/5 of the width of the respective belt.

Figure 6:
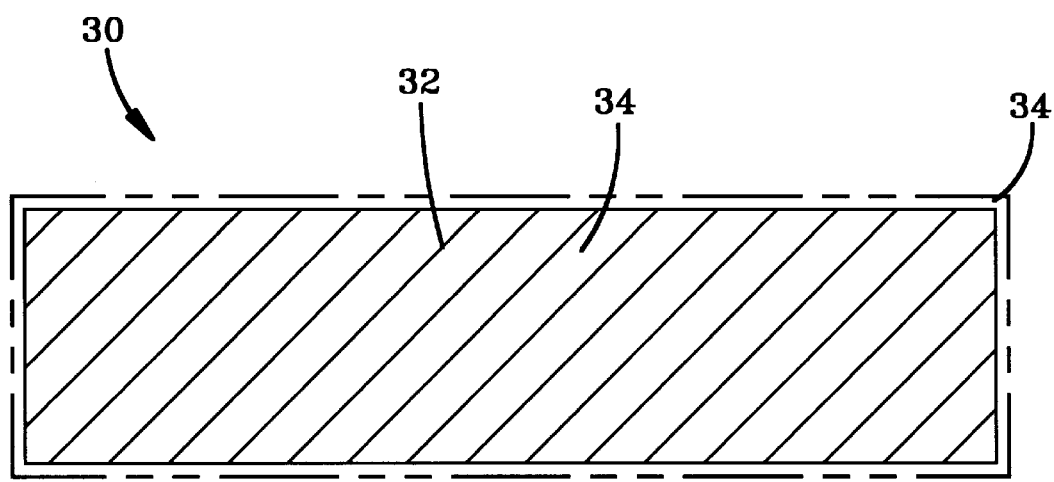
FIG. 6 illustrates a gum strip with reinforcement cords cut on a bias angle.

With reference now to FIG. 6, reinforced gum strip 30 comprises cords 32 encased in gum rubber 34. Gum rubber 34 has a modulus of 10 to 25 N/m$^2$, preferably 14 to 20 N/m$^2$, a tensile strength of 15 to 25 N, preferably 18 to 25 N, an elongation at break of 300 to 450%, preferably 325 to 400%, and a tack of 0 to 5, preferably 2 to 5, and more preferably 3 ½ to 4.

It will be apparent that changes may be made in the extent of overlap below the free edges of the belt or in the choice of the type of belt plies; and the gum strip can be superimposed to extend at least partially across the belt width(s). The embodiments of the invention described above should be considered as illustrative and not as limiting the scope of the invention as defined in the following claims.

What is claimed is:

1. A pneumatic tire for high speed use comprising a radial ply carcass, a tread disposed radially outwardly of the crown region of the carcass, a belt assembly including at least one belt ply interposed between the tread portion and the crown region in circumferential surrounding relation to the carcass, whereby at least one belt ply of the belt assembly has a reinforced gum strip covering or folded around a belt edge on each opposed lateral side of the belt assembly, each of the belt plies comprising reinforcement cords extending parallel to one another in each belt ply, and the cords in the first belt ply making with the cords in the second belt ply opposed angles with respect to the equatorial plane of the tire, wherein said reinforced gum strip is made from reinforced elastomeric material and is located in the proximity of the belt edges and wherein reinforcement cords in the gum strip have a density of 105/1 denier to 420/2 denier and make an angle of between 30° and 75° with respect to the tire's equatorial plane.

2. The pneumatic tire of claim 1 wherein said gum strip has a gauge of 0.015 to 0.055 inch.

3. The pneumatic tire of claim 2 wherein said gum strip has a width of 5 to 40 mm.

4. The pneumatic tire of claim 1 wherein reinforcement cords in said gum strip are made of organic polymers selected from the group consisting of nylon, polyester, aromatic polyamides and mixtures thereof.

5. The pneumatic tire of claim 1 wherein gum rubber in said gum strip is natural rubber having a tack of 0 to 5, a modulus of 10 to 25 N/m$^2$, a tensile strength of 15 to 25 N and an elongation at break of 300 to 450%.

6. The pneumatic tire of claim 1 wherein reinforcement cords in the gum strip make an angle of 30° to 45° with respect to the equatorial plane of the tire.

7. A pneumatic tire for high speed use comprising a radial ply carcass, a tread disposed radially outward of a crown region of the carcass, a belt assembly having an overall width substantially equal to that of the tread interposed between the tread portion and the crown region in circumferential surrounding relation to the carcass, whereby the belt assembly includes a first radially innermost belt ply and a second, radially outermost belt ply, each belt ply having reinforcement cords extending parallel to one another and having the same but opposite cord orientation angle with respect to an equatorial plane of the tire, and wherein said angle is 15° to 35° with respect to the equatorial plane of the tire and wherein a gum strip comprising reinforced elastomeric material is superimposed over the edges of the belt plies, and wherein reinforcement cords in the gum strip have a density of 105/1 denier to 420/2 denier and make an angle of 30° to 75° with respect to the equatorial plane of the tire.

* * * * *